United States Patent
Tomada (10) Patent No.: US 9,965,433 B2
(45) Date of Patent: May 8, 2018

(54) CONVERTER MODULE

(71) Applicant: Cisco Technology, Inc., San Jose, CA (US)

(72) Inventor: Franco Tomada, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 381 days.

(21) Appl. No.: 14/715,897

(22) Filed: May 19, 2015

(65) Prior Publication Data

US 2016/0342563 A1    Nov. 24, 2016

(51) Int. Cl.
*G06F 13/42*    (2006.01)
*G06F 13/40*    (2006.01)

(52) U.S. Cl.
CPC ...... *G06F 13/4282* (2013.01); *G06F 13/4027* (2013.01)

(58) Field of Classification Search
CPC .. G06F 13/382; G06F 13/4063; G06F 13/409; H04B 10/40; G02B 6/4246
See application file for complete search history.

(56) References Cited

U.S. PATENT DOCUMENTS

| | | | | |
|---|---|---|---|---|
| 7,513,698 B2 * | 4/2009 | Andersson | ........... | G02B 6/4292 385/88 |
| 7,934,959 B2 | 5/2011 | Rephaeli et al. | | |
| 8,419,444 B2 * | 4/2013 | Kagan | ................. | H01R 31/065 439/76.1 |
| 8,641,429 B2 * | 2/2014 | Fish | .................. | H01R 13/6658 439/76.1 |
| 9,077,452 B2 * | 7/2015 | Tang | ................... | H04B 10/40 |
| 9,100,123 B2 * | 8/2015 | Tang | ................... | H04B 10/40 |
| 9,201,202 B2 * | 12/2015 | Lai | ............................ | H04B 3/00 |
| 9,380,003 B2 * | 6/2016 | Tang | .................. | H04Q 11/0071 |
| 9,497,518 B2 * | 11/2016 | Mills | .................. | H04Q 11/0003 |
| 9,515,740 B2 * | 12/2016 | Cafiero | ............. | H04B 10/2581 |
| 9,529,172 B2 * | 12/2016 | Baker | ...................... | G02B 6/28 |

(Continued)

FOREIGN PATENT DOCUMENTS

CN    103490904 A    1/2014

OTHER PUBLICATIONS

Cisco Data Sheet—"Cisco QSFP to SFP or SFP+ Adapter Module"; 2 pages dated Jan. 2015.*

(Continued)

*Primary Examiner* — Brian T Misiura
(74) *Attorney, Agent, or Firm* — Edell, Shapiro & Finnan, LLC (57) ABSTRACT

A converter module is provided that is configured to provide data connectivity between at least two external devices, where the converter module comprises a pair of first connectors and up to eight second connectors. The pair of first connectors is configured to be plugged into and interfaced with ports on a first external device. The second connectors are configured to receive and interface with cables. The converter module also comprises a demultiplexing and multiplexing unit that is configured to split signals received via the pair of first connectors or combine signals received by plurality of second connectors. The pair of first connectors receive and couple signals at a first data rate, while the second connectors receive and couple signals at a second data rate. The first data rate may be four times the second data rate.

20 Claims, 7 Drawing Sheets

(56) References Cited

U.S. PATENT DOCUMENTS

| | | | |
|---|---|---|---|
| 9,531,594 B2* | 12/2016 | Venkatesan | H04L 41/0809 |
| 9,639,498 B2* | 5/2017 | Petrick | G06F 13/426 |
| 2012/0071011 A1* | 3/2012 | Kagan | H01R 31/065 |
| | | | 439/76.1 |
| 2013/0251052 A1* | 9/2013 | Tang | H04L 25/03878 |
| | | | 375/259 |
| 2013/0272348 A1 | 10/2013 | Lai et al. | |
| 2014/0248059 A1 | 9/2014 | Tang et al. | |
| 2014/0363171 A1 | 12/2014 | Tang et al. | |
| 2014/0369347 A1* | 12/2014 | Orsley | H04L 49/356 |
| | | | 370/358 |
| 2015/0155963 A1* | 6/2015 | Tang | H04B 10/40 |
| | | | 398/83 |

OTHER PUBLICATIONS

Cisco Data Sheet—"Cisco 40GBASE QSFP Modules"; 13 pages dated Apr. 2017.*

OPTOKON—"SFP+/SFP+ passive cable assembly"; 1 page, Dated Dec. 17, 2014 (Year: 2014).*

* cited by examiner

CONVERTER MODULE

TECHNICAL FIELD

The present disclosure relates to modules for converting Quad-Small Form-Factor Pluggable (QSFP) ports into multiple Enhanced Small Form-Factor Pluggable (SFP+) ports.

BACKGROUND

Multiple Source Agreement (MSA) specifications for an enhanced Small Form-Factor Pluggable (SFP+) transceiver module define a hot-pluggable transceiver module that is used to support communications at a data rate of ten gigabits per second (10 G) using one or more communication standards. Additionally, MSA specifications for a Quad Small Form-Factor Pluggable (QSFP) transceiver module define a hot-pluggable module that integrates four transmit and four receive 10 G channels with a standard multi-fiber push-on (MPO) parallel optical connector for high-density applications. QSFP transceiver modules enable data communications at a data rate of up to forty gigabits per second (40 G) or up to one hundred gigabits per second (100 G). For example, the QSFP transceiver module may send and receive 40 G data across four 10 G data paths. The QSFP transceiver module may send and receive 100 G data across four 25 G data paths.

Servers often utilize one or two Ethernet switches installed inside the server rack. These switches often feature 40 G or 100 G ports for QSFP transceivers, while other servers in the same rack may only have ports for SFP+ transceivers. In order to connect the QSFP transceivers to the SFP+ transceivers, a converter module is needed.

DESCRIPTION OF EXAMPLE EMBODIMENTS

Overview

A converter module is provided that is configured to provide data connectivity between devices. The converter module includes a pair of first connectors. The converter module further includes a plurality of second connectors which may be grouped into a first set of second connectors and a second set of second connectors. The first set of second connectors comprises four second connectors, and the second set of second connectors also comprises four second connectors. The two first connectors are configured to interface with ports of a host device to support the exchange of a plurality of data signals between the host device and the plurality of first connectors via the ports. The converter module also includes a demultiplexing and multiplexing unit. The demultiplexing and multiplexing unit is configured to receive a first signal from one of the first connectors and split the first signal to four outgoing signals having the same data rate. The demultiplexing and multiplexing unit is further configured to receive a second signal from the other of the first connectors and to split the second signal into four outgoing signals that also having the same data rate. The outgoing signals are then sent to a secondary external device via the first set of second connectors and the second set of second connectors.

In addition, the converter module may be configured to receive four first incoming signals via the first set of second connectors from the secondary external device, where the four first incoming signals have the same data rate. The converter module may be also configured to receive four second incoming signals via the second set of second connectors from the secondary external device, where the four second incoming signals also have the same data rate. The demultiplexing and multiplexing unit may receive the four first incoming signals and combine (e.g., "upscale") the signals into a first outgoing signal that is sent to one of the first connectors. Furthermore, the demultiplexing and multiplexing unit may receive the four second incoming signals and combine (e.g., "upscale") the signals into a second outgoing signal that is sent to the other of the first connectors. The first outgoing signal and the second outgoing signal may then be supplied to the host device via the ports with which the two first connectors are interfaced.

Example Embodiments

The techniques presented herein relate to enabling data communications between devices via one or more converter modules. In general, the converter modules provide data connectivity between a first external device configured to support data transmissions at a first data rate and at least one second external device configured to support data transmissions at a second data rate.

Figure 1:
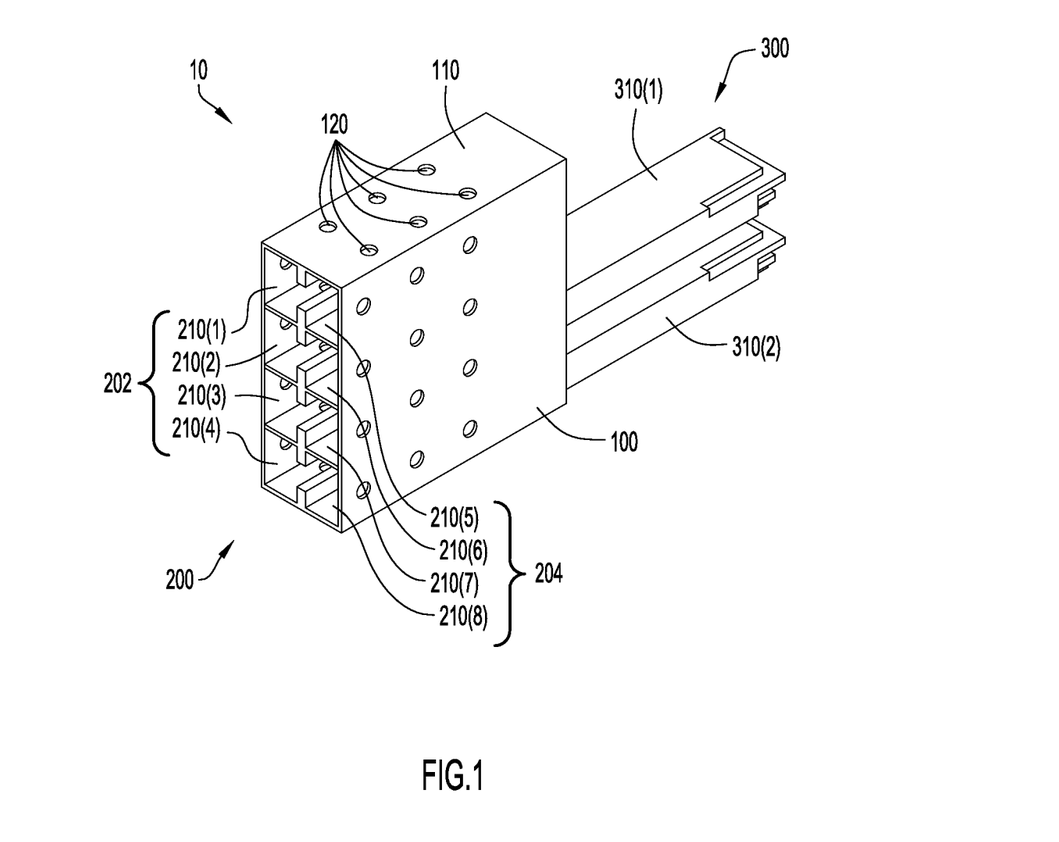
FIG. 1 illustrates an embodiment of the converter module with first connectors and second connectors that enable data connectivity between a host device and a system device, according to an example embodiment.

An example embodiment of the converter module 10 is illustrated in FIG. 1. The converter module 10 includes a housing 100 that contains an outer surface 110 and plurality of apertures 120 that are disposed on the outer surface 110 of the housing 100. The housing 100 includes a front side 200 and a rear side 300. As illustrated, the front side 200 includes a first group of second connectors 202 and a second group of second connectors 204, arranged in columns, where each column has four connectors. The first group of second connectors 202 includes four connectors 210(1)-210(4), while the second group of second connectors 204 includes four connectors 210(5)-210(8). In other embodiments of the converter module 10, the second connectors may be aligned in a different manner. For other embodiments of the converter module 10, the front side 200 may include a number of second connectors that is greater or less than the eight second connectors illustrated. Moreover, the rear side 300 includes a pair of first connectors including first connector 310(1) and a first connector 310(2). As illustrated, the first connector 310(1) and the first connector 310(2) extend substantially outwardly from the rear side 300 of the housing 100. The converter module 10 may also include a number of first connectors that is greater or less than the two first connectors as illustrated on the rear side 300 of the converter module 10.

Figure 2:
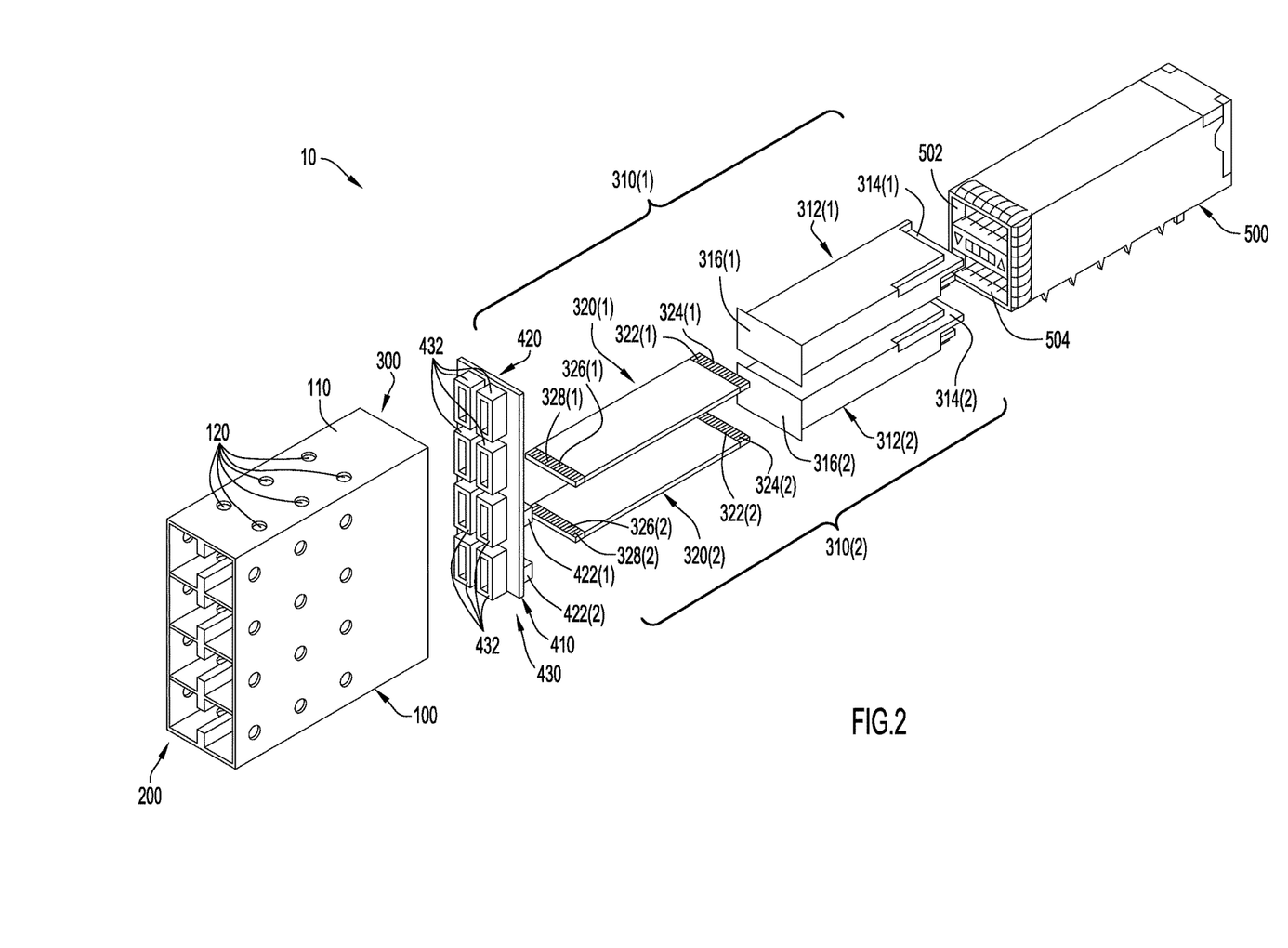
FIG. 2 illustrates an exploded view of the converter module illustrated in FIG. 1, according to an example embodiment.

Illustrated in FIG. 2 is an exploded view of the converter module 10, where internal components of the converter module 10 are shown. As previously stated, the converter module 10 includes housing 100, which includes a front side 200 and a rear side 300. As illustrated in both FIGS. 1 and 2, the outer surface 110 of the housing 100 includes the plurality of apertures 120. The apertures 120 are configured to promote airflow through the interior of the housing 100, which assists in preventing overheating of the components of the converter module 10. The exploded view of the converter module 10 further illustrates the internal components of the pair of first connectors 310(1) and 310(2), an interposer board 410, and a first external device 500.

FIG. 2 illustrates that the first connector 310(1) includes an enclosure 312(1) and a first circuit board 320(1). The enclosure 312(1) includes the first side 314(1) and a second side 316(1). The second side 316(1) of the enclosure 312(1) is configured to be disposed on the rear side 300 of the housing 100. Moreover, the enclosure 312(1) is sized and configured to cover the first circuit board 320(1). The first circuit board 320(1) contains a first end 322(1) and a second end 326(1), where the first end 322(1) may include a set of pins 324(1) and the second end 326(1) may include a set of pins 328(1).

In addition, the first connector 310(2) also includes an enclosure 312(2) and a second circuit board 320(2). The enclosure 312(2) includes the first side 314(2) and a second side 316(2). Similar to the enclosure 312(1) of the first connector 310(1), the second side 316(2) of the enclosure 312(1) of the first connector 310(2) is configured to be disposed on the rear side 300 of the housing 100. Moreover, the enclosure 312(2) is sized and configured to substantially cover the second circuit board 320(2). Similar to the first circuit board 320(1) of the first connector 310(1), the second circuit board 320(2) of the first connector 310(2) contains a first end 322(2) and a second end 326(2), where the first end 322(2) may include a set of pins 324(2) and the second end 326(2) may include a set of pins 328(2).

Continuing with reference to FIG. 2, further illustrated is an interposer board 410. The interposer board 410 is configured to be disposed within the interior of the housing 100. The interposer board 410 further includes a first side 420 and a second side 430. The first side 420 of the interposer board 410 includes a pair of first connector ports 422(1) and 422(2), and the second side 430 of the interposer board 410 includes eight second connector ports 432. The first connector port 422(1) is configured to interface with the first connector 310(1) to support the transfer of a data signal between the first connector 310(1) and the first connector port 422(1). The first connector port 422(2) is configured to interface with the first connector 310(2) to support the transfer of a data signal between the first connector 310(2) and the first connector port 422(2). When assembled, the set of pins 328(1) on the second end 326(1) of the first circuit board 320(1) may be configured to be at least partially inserted into the first connector port 422(1) on the interposer board 410, and the set of pins 328(2) on the second end 326(2) of the board 320(2) may be configured to be at least partially inserted into the first connector port 422(2) on the interposer board 410. In addition, the second connector ports 432 are configured to interface with the second connectors 210(1)-210(8) to support the transfer of data signals between the second connector ports 432 the second connectors 210(1)-210(8). The interposer board 410 may be a printed circuit board (PCB). The interposer board 410 may be configured to route data signals from one connector to another, as will be further explained below. In addition, the interposer board 410 may be a printed circuit board that contains one or more programmable logic devices.

FIG. 2 further illustrates a first external device 500. The first external device 500 includes a first port 502 and a second port 504. The set of pins 324(1) on the first end 322(1) of the first circuit board 320(1) may be configured to be at least partially inserted into the first port 502 of the first external device 500. Moreover, the set of pins 324(2) on the first end 322(2) of the second circuit board 320(2) may be configured to be at least partially inserted into the second port 504 of the first external device 500. Thus, when the pins 324(1) and 324(2) are inserted into the first and second ports 502, 504 of the first external device 500, the pins 324(1) and 324(2) may be configured to interface with (e.g., "plug into") the ports 502, 504 of the first external device 500. Furthermore, when the circuit boards 320(1) and 320(2) are interfaced with the interposer board 410 and the ports 502, 504 of the first external device 500, the circuit boards 320(1) and 320(2) of the first connectors 310(1) and 310(2) may be each configured to carry a data signal between the first external device 500 and the interposer board 410. In addition, the circuit boards 320(1) and 320(2) may contain logic that may be configured to serve as a repeater that retransmits the data signals at a higher level or higher power. The first external device 500 may be a Quad Small Form-Factor Pluggable (QSFP) transceiver that is configured to send and receive 40 G data. In another embodiment the first external device 500 may be a QSFP transceiver that is configured to send and receive 100 G data. In other embodiments, the rate/bandwidth of the data sent and received by the first external device 500 may be different than 40 G or 100 G.

Figure 3:
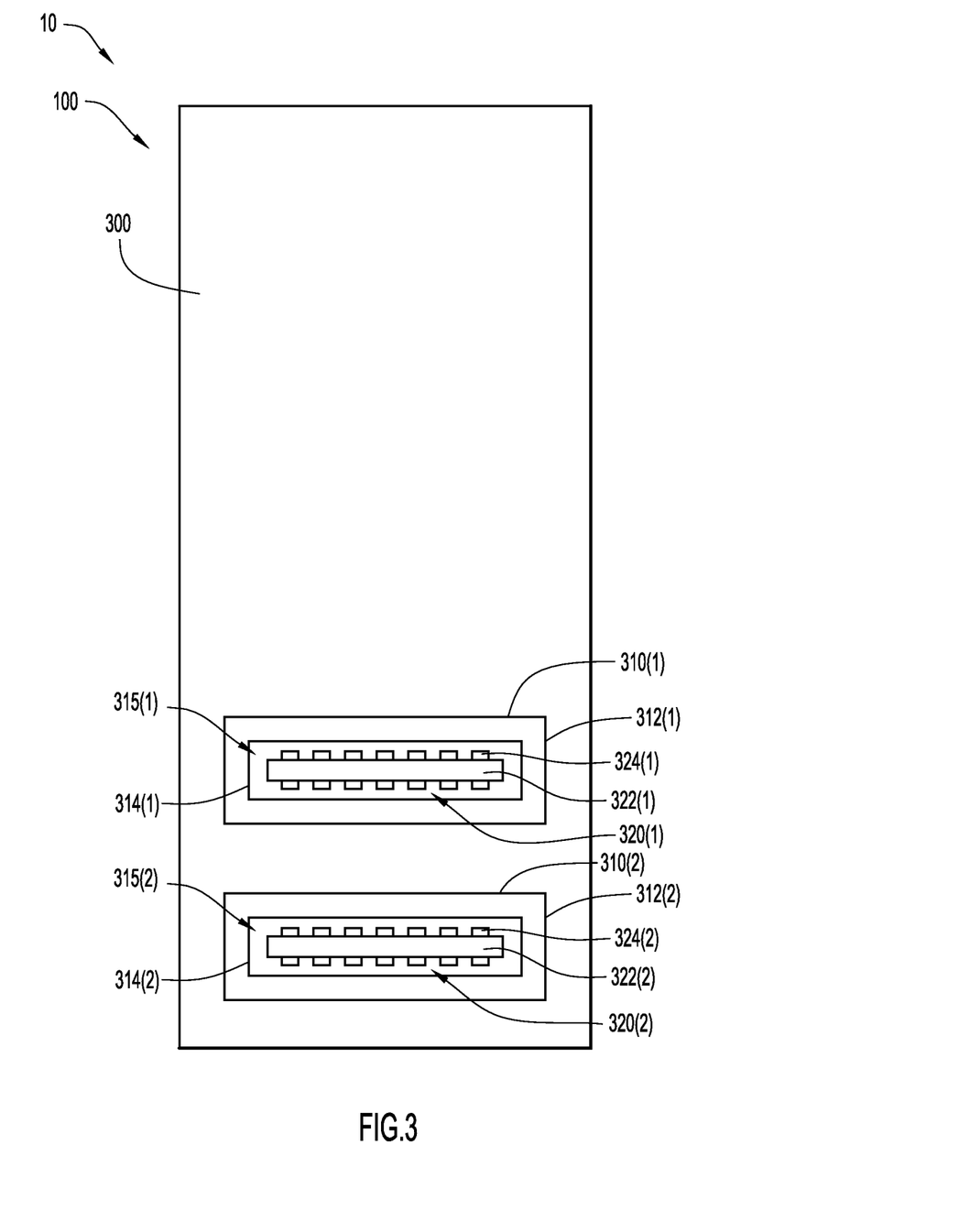
FIG. 3 illustrates a rear view of the converter module illustrated in FIG. 1 according to an example embodiment.

Turning to FIG. 3, illustrated is a rear view of the converter module 10 that shows the rear side 300 of the housing 100. Proximate to the bottom of the rear side 300 of the housing 100 is the first connector 310(1) and the second connector 310(2). The first connector 310(1) is disposed on the rear side 300 above the second connector 310(2). As previously stated, the first connector 310(1) and the second connector 310(2) extend outwardly from the rear side 300 of the housing 100. Further illustrated in FIG. 3 are the first end 314(1) of the enclosure 312(1) of the first connector 310(1) and the first end 314(2) of the enclosure 312(2) of the first connector 310(2). The first end 314(1) of the enclosure 312(1) of the first connector 310(1) defines an opening 315(1). Disposed within the opening 315(1) are the pins 324(1) of the first end 322(1) of the first circuit board 320(1). Similarly, the first end 314(2) of the enclosure 312(2) of the first connector 310(2) defines an opening 315(2). Disposed within the opening 315(2) are the pins 324(2) of the first end 322(2) of the second circuit board 320(2). The first end 314(1) of the enclosure 312(1) of the first connector 310(1) and the first end 314(2) of the enclosure 312(2) of the first connector 310(2) may be configured to be plugged into and interfaced with QSFP ports on an external device.

Figure 4:
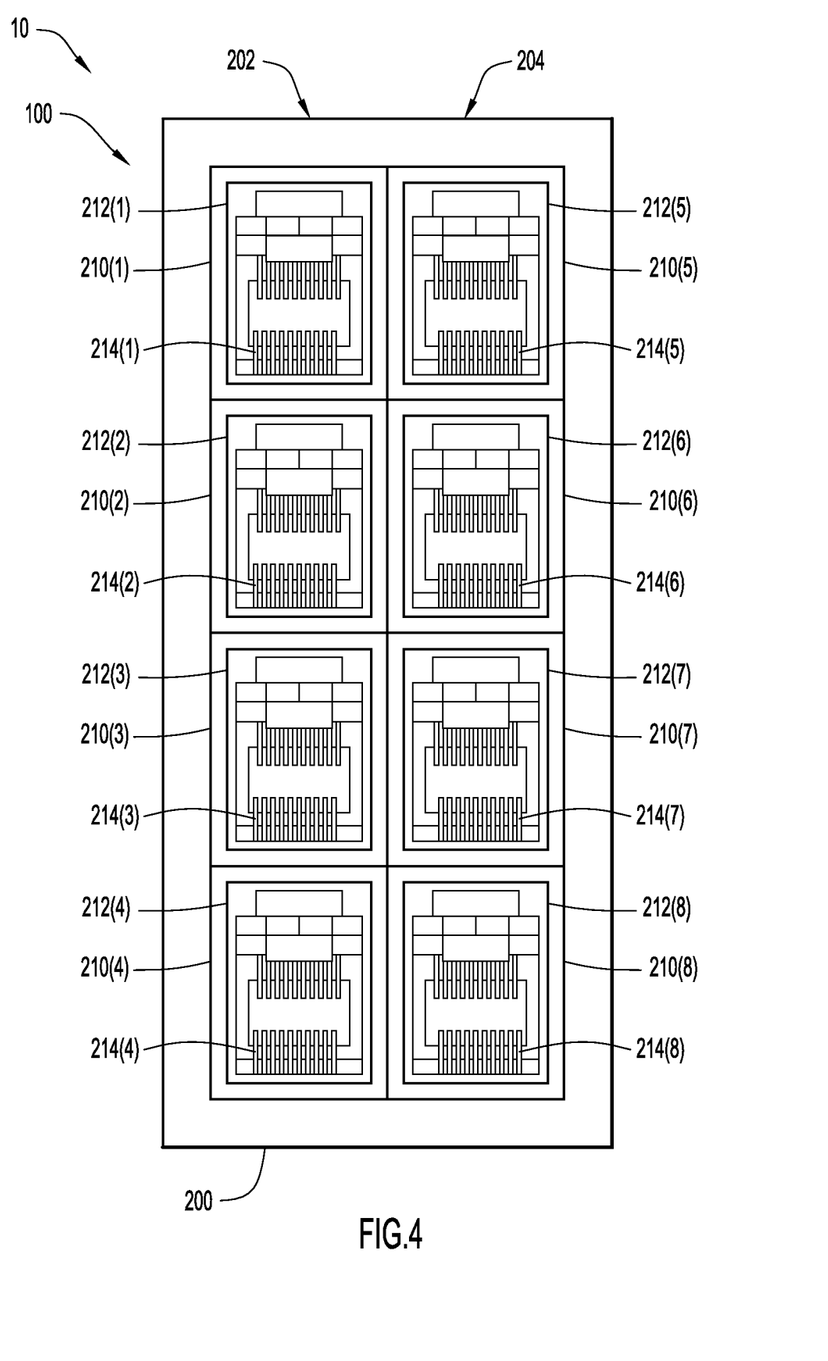
FIG. 4 illustrates a front view of the converter module illustrated in FIG. 1, according to an example embodiment.

Turning to FIG. 4, illustrated is a front view of the converter module 10 that shows the front side 200 of the housing 100. The front side 200 of the housing 100, as illustrated in FIG. 4, includes eight second connectors. In other embodiments, the number of second connectors may be greater than or less than eight. The second connectors may be grouped into a first set of second connectors 202 and second sets of second connectors 204, as described above in connection with FIG. 1. The second connectors 210(1)-210(4) each includes an opening 212(1)-212(4) and a set of pins 214(1)-214(4) disposed within the opening 212(1)-212(4). The second connectors 210(5)-210(8) each includes an opening 212(5)-212(8) and a set of pins 214(5)-210(8) disposed within the opening 212(5)-212(8). The pins 214(1)-214(8) may be, for example, 20-pin SFP+ connectors configured to interface with pins of the respective SFP+ cable connectors.

As illustrated, the first set of second connectors 202 are positioned in a column-like orientation on the left side of the front side 200 of the housing 100. Conversely, the second set of second connectors 204 are positioned in a column-like orientation on the right side of the front side 200 of the housing 100. In other embodiments, the first set of the second connectors 202 may be positioned as the four second connectors 210(1), 210(2), 210(5), 210(6) on the top of the front side 200 of the housing 100, while the second set of second connectors 204 may be positioned as the four second connectors 210(3), 210(4), 210(7), 210(8) on the bottom of the front side 200 of the housing 100. The openings 212(1)-212(8) may be configured to receive cable connectors that are configured to be SFP+ cable connectors. Thus, the SFP+ connectors are configured to interface with the pins 214(1)-214(8) of the second connectors 210(1)-210(8).

Figure 5:
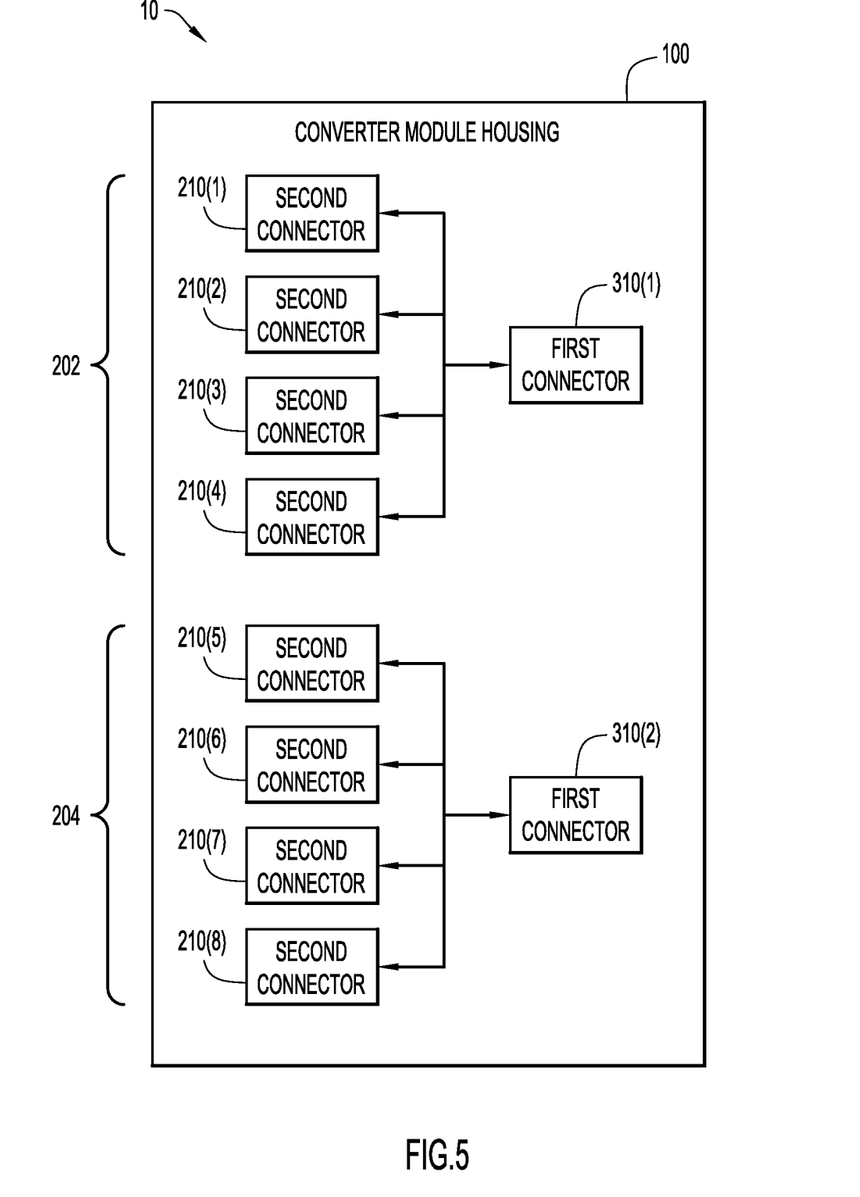
FIG. 5 illustrates a functional block diagram of the connectors in the housing of the converter module illustrated in FIG. 1, according to an example embodiment.

Turning to FIG. 5, illustrated is a functional block diagram of the housing 100 of the converter module 10, and in particular of the pair of first connectors 310(1) and 310(2) and the second connectors 210(1)-210(8). As illustrated in FIG. 5, the first connector 310(1) is coupled to the first set of second connectors 202, which, as previously stated, includes the second connectors 210(1)-210(4). Thus, a data signal that is received by the first connector 310(1) is demultiplexed, or split, into four data signals that are sent to the second connectors 210(1)-210(4), where each of the data signals have the same data rate. It then follows that when the second connectors 210(1)-210(4) receive data signals having the same data rate, those data signals are combined, multiplexed, or upscaled, into a single data signal that is sent to the first connector 310(1).

Similarly, the first connector 310(2) is coupled to the second set of second connectors 204, which, as previously stated, includes second connectors 210(5)-210(8). A data signal that is received by the first connector 310(2) is demultiplexed, or split, into four data signals that are sent to the second connectors 210(5)-210(8), where each of the data signals have the same data rate. It then follows that when the second connectors 210(5)-210(8) receive data signals having the same data rate, those data signals are combined, multiplexed, or upscaled into a single data signal that is sent to the first connector 310(2).

Figure 6:
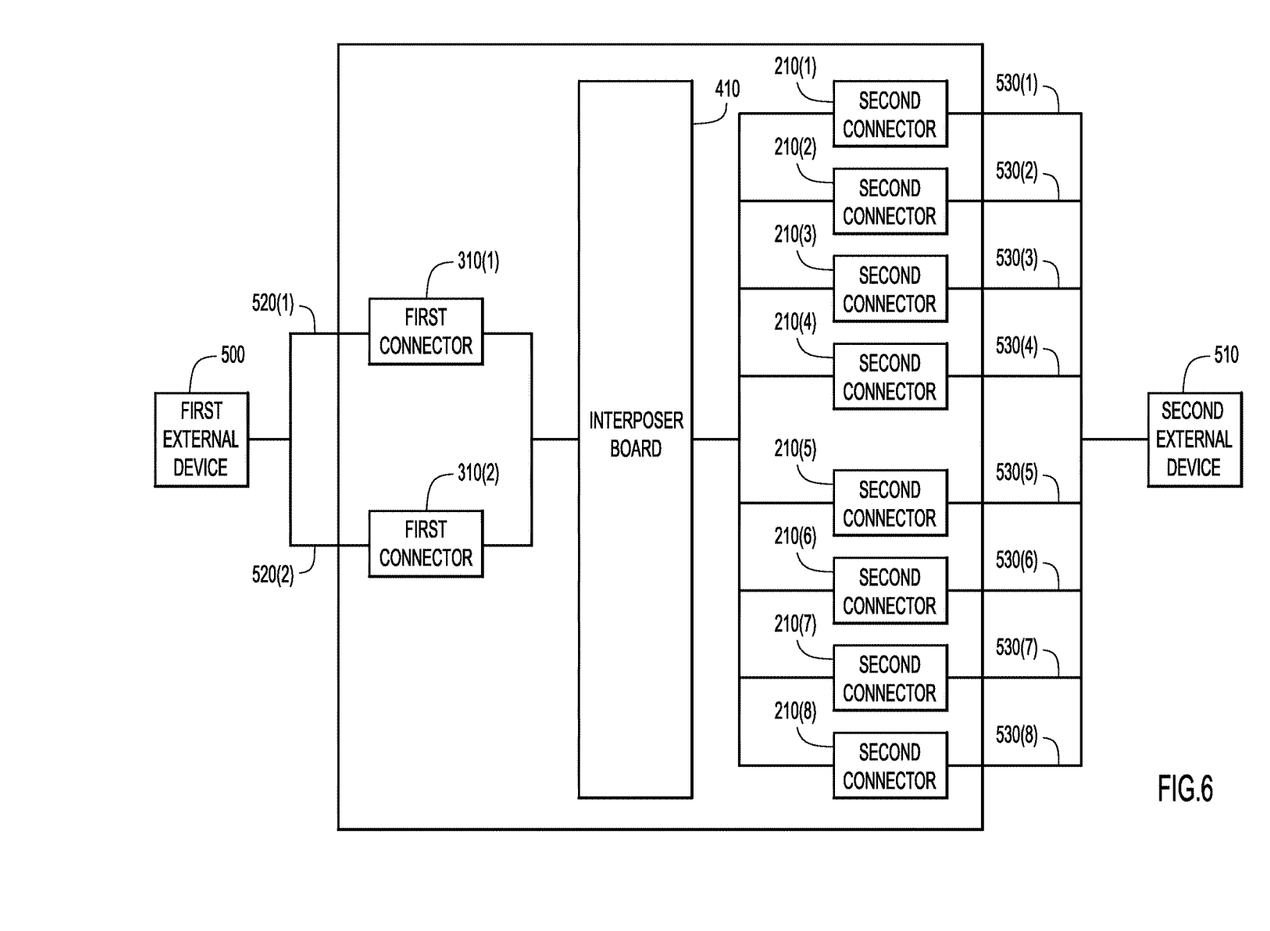
FIG. 6 illustrates a functional block diagram of the data transfer from a first device to a second device via the converter module illustrated in FIG. 1, according to an example embodiment.

Turning to FIG. 6, illustrated is a functional block diagram of the data transfer from the first external device 500 to a second external device 510 via the converter module 10, and vice versa. As previously stated, the first external device 500 may be a QSFP transceiver that is configured to send and receive 40 G data or 100 G data. The second external device 510 may be an SFP+ transceiver that is configured to send and receive 10 G data or 25 G data. As previously stated, and as illustrated in FIG. 2, the first device 500 may include a first port 502 and a second port 504, where the pair of first connectors 310(1) and 310(2) may be configured to be at least partially inserted into the first port 502 and the second port 504, respectively. Unlike the first external device 500, the second external device 510 does not contain a portion of converter module 10 that is inserted into any of the ports of the second external device 510. Thus, the second external device 510 may be interfaced with SFP+ cables that are also interfaced with the second connectors 210(1)-210(8) of the converter module 10 to transfer data signals from the converter module 10 to the second external device 510. The first device 500 may couple two data signals to the converter module 10 shown in FIG. 5 as a pair of first data signals 520(1) and 520(2), where the two data signals have equal data rates. As illustrated in FIG. 6, the first data signal 520(1) is coupled to the first connector 310(1) while the first data signal 520(2) is coupled to the first connector 310(2). The first connectors 310(1) and 310(2) couple the first data signals 520(1), 520(2) to the interposer board 410. As previously explained, the interposer board 410 may be a printed circuit board that contains one or more programmable logic devices that may be configured to enable the interposer board 410 to serve as a demulitplexing and/or multiplexing unit. Thus, the interposer board 410 is configured to demultiplex, or split, the first data signal 520(1) into four second data signals, where each of the second data signals having data rates that are equivalent to one another. The interposer board 410 is further configured to demultiplex, or split, the first data signal 520(2) into the four second data signals, where each of the second data signals having equal data rates. The interposer board 410 may be configured to split the first data signal 310(1) into second data signals 530(1)-530(4). The interposer board 410 may also be configured to split the first data signal 520(2) into second data signals 530(5)-530(8). If the first data signals 520(1) and 520(2) are 40 G signals, than each of the second data signals 530(1)-530(8) will be 10 G signals. If the first data signals 520(1) and 520(2) are 100 G signals, than each of the second data signals 530(1)-530(8) will be 25 G signals. Thus, the second data signals 530(1)-530(4) represent one fourth of the bandwidth/data rate of the first data signal 520(1), while the second data signals 530(5)-530(8) represent one fourth of the bandwidth/data rate of the first data signal 520(2).

As further illustrated in FIG. 6, once the interposer board 410 has split the first data signals 520(1) and 520(2) into a total of eight second data signals 530(1)-530(8), the data signals are coupled to their respective second connectors 210(1)-210(8). Thus, the second data signal 530(1) is coupled to the second connector 210(1), the second data signal 530(2) is coupled to the second connector 210(2), the second data signal 530(4) is coupled to the second connector 210(3), and the second data signal 530(4) is coupled to the second connector 210(4). Furthermore, the second data signal 530(5) is coupled to the second connector 210(5), the second data signal 530(6) is coupled to the second connector 210(6), the second data signal 530(7) is coupled to the second connector 210(7), and the second data signal 530(8) is coupled to the second connector 210(8). Because each of the second connectors 210(1)-210(8) are configured to receive an SFP+ connector of a cable, the second connectors 210(1)-210(8) may be configured to couple the second data signals 530(1)-530(8) to SFP+ cables, and eventually to a second external device 510.

Conversely, the second external device 510 may couple several data signals 530(1)-530(8) via SFP+ cables to the plurality of second connectors 210(1)-210(8). The second connectors 210(1)-210(4) may receive and couple the second data signal 530(1)-530(4), respectively, to the interposer board 410. Similarly, the second connectors 210(5)-210(8) may receive and couple the second data signal 530(5)-530(8), respectively, to the interposer board 410. When the interposer board 410 receives the second data signals 530(1)-530(4), the interposer board 410 combines, or multiplexes, the second data signals 530(1)-530(4) into a single first data signal 520(1) that is coupled to the first connector 310(1). Similarly, when the interposer board 410 receives the second data signals 530(5)-530(8), the interposer board 410 combines, or multiplexes, the second data signals 530(5)-530(8) into a single first data signal 520(2) that is coupled to the first connector 310(2). Because the first connectors 310(1) and 310(2) are interfaced with the first external device 500, the first connectors 310(1) and 310(2) couple the first data signals 520(1) and 520(2) to the first external device 500.

Figure 7:
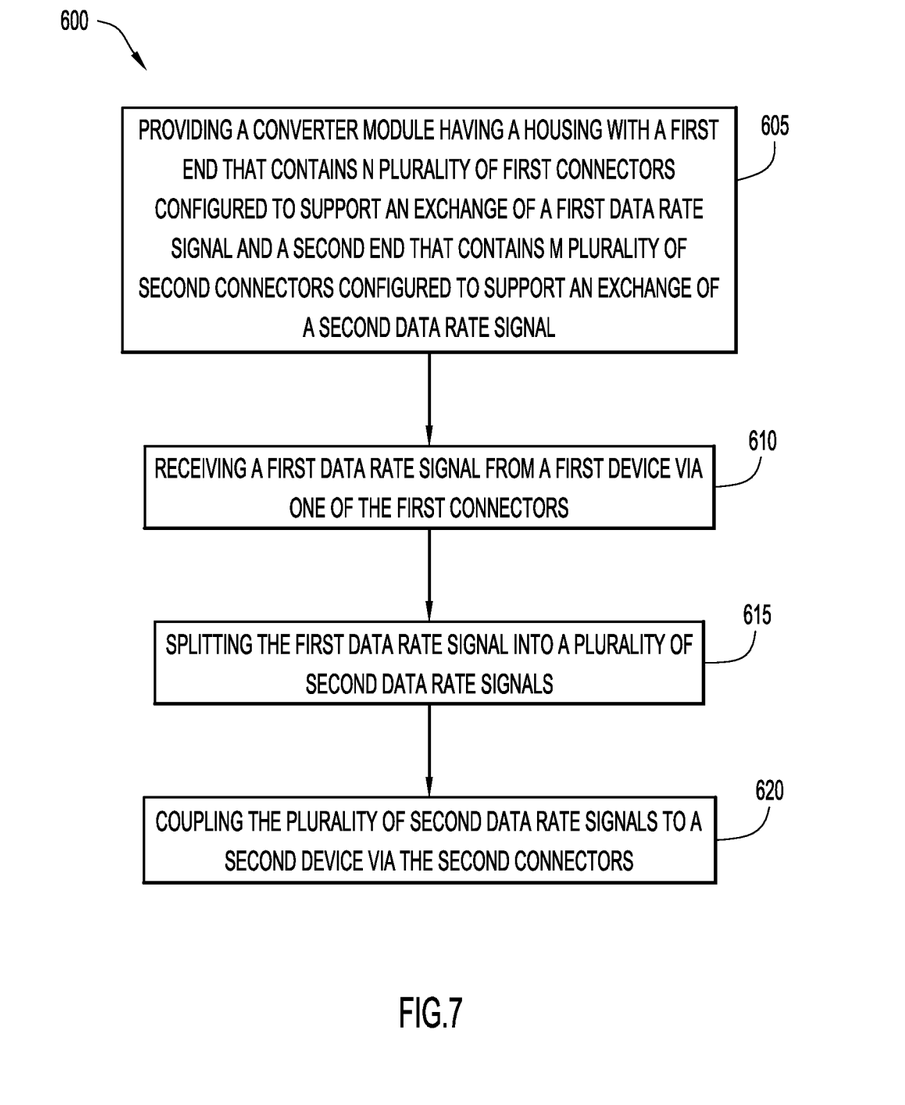
FIG. 7 shows a flow chart depicting operations of the converter module illustrated in FIG. 1 to provide data connectivity between devices, according to an example embodiment.

Turning to FIG. 7, illustrated is a flow chart 600 that depicts the operations for the converter module 10 to provide data connectivity between first and second devices. At 605, a converter module is provided that includes a housing with a first, or rear end, containing N plurality of first connectors configured to support an exchange of a first data rate signal. The housing of the converter module also includes a second, or front end that contains M plurality of second connectors configured to support an exchange of a plurality of second data rate signals. As previously explained, the first data rate signal may be a 40 G data signal or a 100 G data signal. Furthermore, the second data rate signals) may be a 10 G data signal or a 25 G data signal. At 610, the converter module receives a first data rate signal from a first device via one of the first connectors. At 615, the converter module then splits the first data rate signal into a plurality of second data rate signals 530(1)-530(8), where each of the second data rate signals may have an equal data rate. Finally, at 620, the converter module couples the plurality of second data rate signals a second device via the second connectors.

It should be appreciated that the techniques described above in connection with all embodiments may be performed by one or more computer readable storage media that is encoded with software comprising computer executable instructions to perform the methods and steps described herein. For example, the operations performed by the converter module 10 may be performed by one or more computer or machine readable storage media or device executed by a processor and comprising software, hardware or a combination of software and hardware to perform the techniques described herein.

In summary, an apparatus is provided that comprises a housing that includes a first end and a second end, where the first end is oriented opposite of the second end of the housing. The first end includes N plurality of first connectors configured to support an exchange of a first data rate signal. The second end includes M plurality of second connectors configured to support an exchange of a second data rate signal. The number M of second connectors disposed on the housing is equal to four times the number N of first connectors disposed on the housing. The first data signal may be a 40 G signal or a 100 G signal, and the second data rate signal may be a 10 G signal or a 25 G signal.

A system is provided that comprises at least one device configured to send and receive a first data rate signal or a second data rate signal, and a converter module. The converter module includes a housing with a first end and a second end. The first end of the housing includes a plurality of first connectors configured to support an exchange of a first data rate signal. The second end of the housing includes a plurality of second connectors configured to support an exchange of a second data rate signal. The data rate of the first data rate signal may be four times the data rate of the second data rate signal. Moreover, the first end of the housing may be oriented opposite of the second end of the housing.

The above description is intended by way of example only. Various modifications and structural changes may be made therein without departing from the scope of the concepts described herein and within the scope and range of equivalents of the claims.

What is claimed is:

1. An apparatus comprising:
   a housing comprising:
      a first side including N plurality of first connectors extending outwardly from the first side of the housing and configured to support an exchange of a first data rate signal, each of the plurality of first connectors having a circuit board;
      a second side including M plurality of second connectors disposed within the second side and configured to support an exchange of a second data rate signal; and
      an interposer printed circuit board oriented in a substantially vertical orientation within the housing and connected to the circuit board of each of the plurality of first connectors;
   wherein the M is equal to four times N, and the first data rate signal is greater than the second data rate signal.

2. The apparatus of claim 1, wherein the first connector is configured to interface with a Quad-Small Form-Factor Pluggable (QSFP) port on a host device or a QSFP connector of a cable, and the second connector is configured to interface with an enhanced Small Form-Factor Pluggable (SFP+) port on a host device or an SFP+connector of a cable.

3. The apparatus of claim 1, wherein each first connector is configured to support an exchange of a 40 gigabit per second (40 G) signal, and each second connector is configured to support an exchange of a 10 gigabit per second (10 G) signal.

4. The apparatus of claim 1, wherein each first connector is configured to support an exchange of a 100 gigabit per second (100 G), and each second connector is configured to support an exchange of a 25 gigabit per second (25 G) signal.

5. The apparatus of claim 1, wherein a data rate of the first data rate signal is four times a data rate of the second data rate signal.

6. A method comprising:
   providing a converter module having a housing with a first side that contains N plurality of first connectors extending outwardly from the first side and configured to support an exchange of a first data rate signal, each of the plurality of first connectors having a circuit board, a second side that contains M plurality of second connectors disposed within the second side and configured to support an exchange of a second data rate signal, and an interposer printed circuit board oriented in a substantially vertical orientation within the housing, the interposer printed circuit board being connected to the circuit board of each of the plurality of first connectors;
   receiving a first data rate signal from a first device via one of the first connectors;
   splitting the first data rate signal into four second data rate signals, wherein the four second data rate signals are of equal data rates; and
   coupling the four second data rate signals to a second device via the second connectors.

7. The apparatus of claim 1, wherein the circuit board of each of the plurality of first connectors includes set of pins.

8. The apparatus of claim 7, wherein the interposer printed circuit board includes one or more connector ports disposed on a first side of the interposer printed circuit board, the set of pins of the circuit board of each of the plurality of connectors being at least partially inserted into the one or more connector ports.

9. The method of claim 6, further comprising:
receiving four second data rate signals from a second host device via four of the second connectors, wherein the four second data rate signals are of equal data rates;
combining the four input second data rate signals into a single first data rate signal; and
coupling the single first data rate signal to the first host device via one of the first connectors.

10. The method of claim 9, wherein combining comprises multiplexing bits of the four second input data rate signals.

11. The method of claim 6, wherein the first connector is configured to interface with a Quad-Small Form-Factor Pluggable (QSFP) port on a host device or a QSFP connector of a cable, and the second connector is configured to interface with an enhanced Small Form-Factor Pluggable (SFP+) port on a host device or an SFP+ connector of a cable.

12. The method of claim 6, wherein each first connector is configured to support an exchange of a 40 gigabit per second (40 G), and each second connector is configured to support an exchange of a 10 gigabit per second (10 G) signal.

13. The method of claim 6, wherein each first connector is configured to support an exchange of a 100 gigabit per second (100 G), and each second connector is configured to support an exchange of a 25 gigabit per second (25 G) signal.

14. A system comprising:
at least one device configured to send and receive a first data rate signal or a second data rate signal; and
a converter module comprising:
a housing comprising:
a first side including a plurality of first connectors extending outwardly from the first side and configured to support an exchange of a first data rate signal, each of the plurality of first connectors including a circuit board;
a second side including a plurality of second connectors disposed within the second side and configured to support an exchange of a second data rate signal; and
an interposer printed circuit board oriented in a substantially vertical orientation within the housing and connected to the circuit board of each of the plurality of first connectors;
wherein a data rate of the first data rate signal is four times a data rate of the second data rate signal, and the first side is oriented opposite of the second side of the housing.

15. The system of claim 14, wherein the first connector is configured to interface with a Quad-Small Form-Factor Pluggable (QSFP) port on a host device or a QSFP connector of a cable, and the second connector is configured to interface with an enhanced Small Form-Factor Pluggable (SFP+) port on a host device or an SFP+ connector of a cable.

16. The system of claim 15, wherein the first connector is configured to support an exchange of a 40 gigabit per second (40 G), and the second connector is configured to support an exchange of a 10 gigabit per second (10 G) signal.

17. The system of claim 15, wherein the first connector is configured to support an exchange of a 100 gigabit per second (100 G), and the second connector is configured to support an exchange of a 25 gigabit per second (25 G) signal.

18. The system of claim 14, wherein the number of second connectors is equal to four times the number of first connectors.

19. The system of claim 14, wherein the circuit board of each of the plurality of first connectors includes set of pins.

20. The system of claim 19, wherein the interposer printed circuit board includes one or more connector ports disposed on a first side of the interposer printed circuit board, the set of pins of the circuit board of each of the plurality of connectors being at least partially inserted into the one or more connector ports.

* * * * *